(12) United States Patent
Campbell

(10) Patent No.: US 12,213,472 B2
(45) Date of Patent: Feb. 4, 2025

(54) OUTDOOR FLY TRAP

(71) Applicant: Stan Campbell, San Antonio, TX (US)

(72) Inventor: Stan Campbell, San Antonio, TX (US)

( * ) Notice: Subject to any disclaimer, the term of this patent is extended or adjusted under 35 U.S.C. 154(b) by 15 days.

(21) Appl. No.: 18/128,570

(22) Filed: Mar. 30, 2023

(65) Prior Publication Data
US 2024/0324574 A1    Oct. 3, 2024

(51) Int. Cl.
*A01M 1/10*    (2006.01)

(52) U.S. Cl.
CPC ....... *A01M 1/106* (2013.01); *A01M 2200/012* (2013.01)

(58) Field of Classification Search
CPC ...................................................... A01M 1/106
See application file for complete search history.

(56) References Cited

U.S. PATENT DOCUMENTS

| | | | | |
|---|---|---|---|---|
| 4,218,842 A | * | 8/1980 | Anderson | A01M 1/04 43/122 |
| 4,638,592 A | * | 1/1987 | Schneidmiller | A01M 1/106 426/1 |
| 6,138,402 A | * | 10/2000 | Wotton | A01M 1/106 43/107 |
| 7,694,456 B1 | * | 4/2010 | Curtis | A01M 1/106 43/107 |
| 11,980,178 B1 | * | 5/2024 | Bishop | A01M 1/02 |
| 2006/0042154 A1 | * | 3/2006 | Rich | A01M 1/02 43/107 |
| 2006/0137240 A1 | * | 6/2006 | Dismore | A01M 1/106 43/107 |

OTHER PUBLICATIONS https://www.youtube.com/watch?v=0artffxV3K8 (Year: 2014).*

* cited by examiner

*Primary Examiner* — Richard G Davis
(74) *Attorney, Agent, or Firm* — Lyman Moulton, Esq.; Moulton Patents, PLLC

(57) ABSTRACT

The Fly Graveyard is the only product of its kind that attracts flies into a novelty trap with an unprecedented, non-poisonous liquid that captures the fly, indefinitely. This avant-garde product is uniquely designed with durable glass materials, designed to look like a fly for fun aesthetics and can be conveniently hung on the wall, placed on the floor, a table and/or any surface area as an improved pest control alternative.

13 Claims, 1 Drawing Sheet

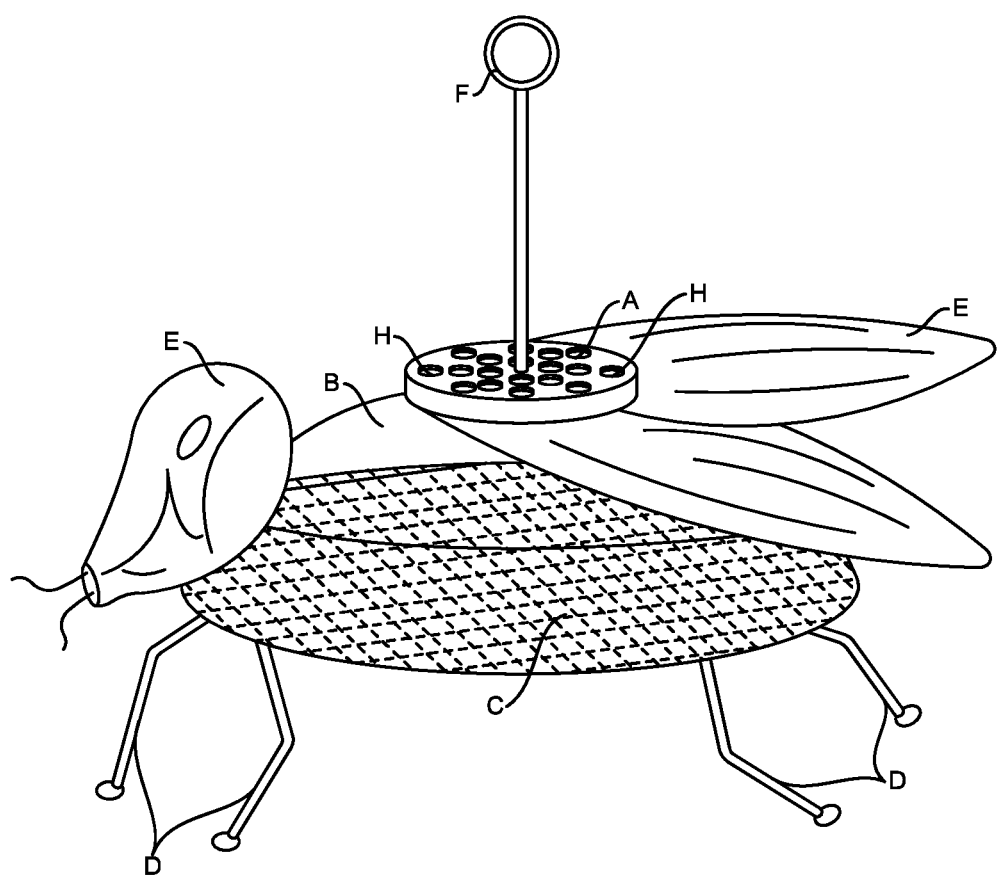

OUTDOOR FLY TRAP

BACKGROUND

Flies are found almost everywhere people live and are a known nuisance when it comes to enjoying outdoor activities and/or indoor dwellings. Finding a way to effectively control and expel flies, however, can be a tedious and troublesome task especially if one elects not to utilize harsh random chemicals to address the problem. There have been no products available as original equipment or as an aftermarket to address this problem.

An apparatus that simplifies the process of expelling flies without having to use harsh chemicals, is not being met by any known device or system at present. There have been no products available as original equipment or as an aftermarket to address this problem either.

SUMMARY OF THE INVENTION

The main purpose of the outdoor fly trap is to provide users with an effective method of capturing flies naturally and safely as a form of pest control. The disclosure includes a perforated screw-on lid comprising an elastic material configured to stretch to allow a fly entering a perforated hole, a fly trap container configured to receive the perforated screw-on lid and a non-poisonous liquid fly bait received into the fly trap container. The term "elastic" complies with the common definition of a material to return to its original shape and size after a force is removed.

BRIEF DESCRIPTION OF THE DRAWINGS

FIG. 1 is a left side perspective view of the outdoor fly trap in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a left perspective view of the outdoor fly trap showing: the perforated screw-on lid referenced as A, 32 oz glass container/fly trap referenced as B, refillable non-poisonous liquid fly bait referenced as C, wire legs referenced as D, fly head referenced as E made out of rubber in embodiments, hanger referenced as F, holes H and wings W in accordance with an embodiment of the present disclosure. The rubber fly head pushes on a glass knot which can rotate left to right one half inch. In the event the glass container B is broken, it can be replaced in a sale and the wings W, lid A, head E and legs D are separate.

The fly trap is made in several sizes including a 12 ounce to 58 ounces and larger and in between sizes. The holes in the lid are ¼ inch round and eight each with one in the center for the hanger F. The wings W are connected with a wire circle that fits over the container threads. The lid is screwed down tight to hold the wings in place.

The presently disclosed outdoor fly trap also known as "The Fly Graveyard", offers a modern accessory that attracts flies into a trap to ensure users are able to efficiently prevent and get rid of these pesky insects, at all times. Expanding on the initial design of the average fly trap function, the Fly Graveyard introduces a novel non-poisonous liquid fly bait that is housed within a glass container, designed to mimic the look of a fly, possessing a perforated/punctured screw-on lid. Users simply place the bait into the fly trap and can then either hang the trap with use of its attached hanger or place it on a flat surface, positioned either indoors or outdoors, based on users preferences. Instead of performing the physical labor of whacking flies with a fly swatter, the Fly Graveyard guarantees users are able to passively capture and remove flies hassle-free.

Embodiments of the disclosure include holes poked in the lid to allow fruit flies to enter but not to exit. The smell of rotting fish helps entice flies into the container trap. A spoiled fish and sugar (2 tablespoons) mixture are dissolved into 2 cups of water to entice and trap the flies. The flies enter the trap and fly crazy and end up coated with sugar water. They can't fly at that point and try to climb to the perforated/punctured openings but fall back into the container grave and die. Once there is a half inch of flies in the mixture, a white milky solution is formed at the bottom of the container trap made up of the mixture and the dead flies. The container trap continues to fill up with thousands of dead flies.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A fly trap comprising:
   a perforated screw-on lid comprising an elastic material configured to stretch to allow a fly entering a perforated hole;
   a fly trap container configured to receive the perforated screw-on lid; and
   a non-poisonous liquid fly bait received into the fly trap container.

2. The fly trap of claim 1, further comprising wire legs on the fly trap container.

3. The fly trap of claim 1, wherein the fly trap container comprises glass.

4. The fly trap of claim 1, wherein the fly trap container comprises a transparent material.

5. The fly trap of claim 1, wherein the fly trap container comprises a rubber head shaped like a head of a domestic house fly.

6. The fly trap of claim 1, further comprising a hanger connected to the fly trap container and configured to suspend the fly trap.

7. The fly trap of claim 1, wherein the screw-on lid is flat and the perforations are shaped from a puncture opening with a sharp edged hole.

8. The fly trap of claim 1, wherein the perforated screw-on lid comprises metal and the perforations are one quarter inch holes.

9. The fly trap of claim 1, wherein the fly trap container has an appearance of a domestic fly.

10. The fly trap of claim 1, wherein the non-poisonous liquid fly bait includes a part surfactant configured to lower a surface tension of the non-poisonous liquid and drown a fly therein.

11. The fly trap of claim 1, wherein the non-poisonous liquid fly bait includes a sugar and water to attract and to drown a domestic house fly respectively.

12. The fly trap of claim 1, wherein the non-poisonous liquid fly bait includes chunks of raw fish.

13. The fly trap of claim 1, wherein the non-poisonous liquid fly bait includes raw shrimp with heads unremoved.

\* \* \* \* \*